United States Patent
Frohnmaier et al.

(10) Patent No.: US 11,433,659 B2
(45) Date of Patent: Sep. 6, 2022

(54) METHOD AND DEVICE FOR ASCERTAINING REQUIRED CONSTRUCTION MATERIAL

(71) Applicant: EOS GmbH Electro Optical Systems, Krailling (DE)

(72) Inventors: Markus Frohnmaier, Hengersberg (DE); Oliver Putz, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 680 days.

(21) Appl. No.: 15/776,262

(22) PCT Filed: Nov. 25, 2016

(86) PCT No.: PCT/EP2016/078814
§ 371 (c)(1),
(2) Date: May 15, 2018

(87) PCT Pub. No.: WO2017/093136
PCT Pub. Date: Jun. 8, 2017

(65) Prior Publication Data
US 2020/0247059 A1     Aug. 6, 2020

(30) Foreign Application Priority Data

Nov. 30, 2015 (DE) .......................... 102015223719.2

(51) Int. Cl.
*B29C 64/393* (2017.01)
*B33Y 50/02* (2015.01)
(Continued)

(52) U.S. Cl.
CPC .............. *B33Y 50/02* (2014.12); *B22F 10/20* (2021.01); *B29C 64/153* (2017.08);
(Continued)

(58) Field of Classification Search
None
See application file for complete search history.

(56) References Cited

U.S. PATENT DOCUMENTS

| 2010/0090374 A1* | 4/2010 | Dietrich | B29C 64/153 |
| | | | 264/497 |
| 2011/0190446 A1 | 8/2011 | Matsui et al. | |
| 2014/0332507 A1* | 11/2014 | Fockele | B23K 26/32 |
| | | | 219/121.61 |

FOREIGN PATENT DOCUMENTS

| DE | 10360094 | 9/2005 |
| DE | 102007029052 | 1/2009 |

(Continued)

OTHER PUBLICATIONS

International Search Report for Application No. PCT/EP2016/078814 dated Mar. 1, 2017, 5 pages.

*Primary Examiner* — Mohammad M Ameen
(74) *Attorney, Agent, or Firm* — Seyfarth Shaw LLP

(57) ABSTRACT

The invention relates to a method for providing required construction material information in the context of producing at least one three-dimensional object using a generative layer construction device, having the following steps: accessing data of a layer to be applied in a first data set in which for each layer to be applied during the production process, it is indicated whether construction material is to be solidified selectively in the layer and if so, at which locations in said layer the construction material is to be solidified; dividing the area of the layer to be applied into sub-regions; assigning weighting factors to the sub-regions, and ascertaining a construction material quantity to be supplied to the coating device in order to apply the layer, wherein the construction material quantity is ascertained using the weighting factors assigned to individual sub-regions and is provided as required construction material information.

12 Claims, 10 Drawing Sheets

(51) Int. Cl.
  *B33Y 10/00* (2015.01)
  *B33Y 30/00* (2015.01)
  *B29C 64/153* (2017.01)
  *B22F 10/20* (2021.01)
  *B22F 10/30* (2021.01)

(52) U.S. Cl.
  CPC ............ *B29C 64/393* (2017.08); *B33Y 10/00* (2014.12); *B33Y 30/00* (2014.12); *B22F 10/30* (2021.01)

(56) References Cited

FOREIGN PATENT DOCUMENTS

| | | |
|---|---|---|
| DE | 102011121568 | 6/2013 |
| DE | 102012012471 | 9/2013 |
| WO | 2015152875 | 10/2015 |
| WO | WO-2015-152875 A1 * | 10/2015 |

* cited by examiner

METHOD AND DEVICE FOR ASCERTAINING REQUIRED CONSTRUCTION MATERIAL

TECHNICAL FIELD OF THE INVENTION

The present invention refers to a method and a provision unit for providing a building material consumption information in the context of a manufacturing of at least one three-dimensional object by means of a layer-wise additive manufacturing device as well as to a method of providing a control command set for a layer-wise additive manufacturing device, which control command set is generated taking into consideration the building material consumption information, as well as to a layer-wise additive manufacturing device and a respective method for manufacturing at least one three-dimensional object by means of a layer-wise additive manufacturing device. In particular, the present invention refers to devices and methods, in which the building material is in powder form.

BACKGROUND OF THE INVENTION

DE 10 2011 121 568 A1 describes a layer-wise additive manufacturing method, in which a metal material in powder form is selectively solidified by means of electromagnetic radiation or electron radiation. In the process, a layer of building material is applied onto a support movable in height within a building chamber and is selectively solidified. This process is continued by repetitively applying and solidifying layers until the three-dimensional object has been completed by a selective solidification of the layers stacked upon each other.

In particular, DE 10 2011 121 568 A1 deals with the problem that the powder usually is always applied on the whole area of the existing building chamber. On the one hand, this leads to a prolonged manufacturing time as a large-area layer is applied, even if only a small fraction of this layer is actually solidified. Furthermore, there is also the disadvantage that large amounts of powder are consumed though only a fraction of the powder is actually solidified.

A high powder consumption is disadvantageous out of several reasons. Disregarding the higher building material costs that will result, there is also the disadvantage that further resources such as the powder handling systems (sieves, feed systems) will be subjected to an increased wear due to more frequent usage. In particular, when very high objects are built, the time for completion may be prolonged due to powder re-filling processes that become necessary. In an extreme case the total height of the object to be manufactured is limited, if a powder re-filling process is inappropriate. A re-use of non-solidified powder that has already been used in a device for a layerwise additive manufacturing has the disadvantage that the powder deteriorates in the device.

In order to solve the mentioned problems, DE 10 2011 121 568 A1 suggests constructing within the building chamber a building cell that tightly surrounds the object to be built. In particular, the building cell wall is successively built from the building material used for the building process by a selective solidification. This makes it possible to vary the position of the building cell wall from layer to layer and to adapt the position of the building cell wall to the respective object cross-section in a layer.

Even though the method described in DE 10 2011 121 568 A1 may definitely lead to a powder saving, the presence of additional walls of solidified building material leads to the result that the unpacking process for the completed objects (removing from the objects non-solidified powder surrounding the same) is impeded. Therefore, the object of the present invention is to provide a method and a device that allow for an alternative optimization of the powder dosage.

SUMMARY OF THE INVENTION

The object is achieved by a method according to claim 1 and claim 11, respectively, a method of manufacturing at least one three-dimensional object by means of a layerwise additive manufacturing device according to claim 12, a provision unit for providing a building material consumption information according to claim 13, a layerwise additive manufacturing device according to claim 14 and a computer program according to claim 15. Further developments of the invention are described in the dependent claims. Here, the methods and the computer program may also be developed further by features of the devices mentioned below and in the dependent claims, respectively.

According to the invention a method of providing a building material consumption information in the context of a manufacturing of at least one three-dimensional object by means of a layer-wise additive manufacturing device is provided. In the layer-wise additive manufacturing device the at least one object is manufactured layer by layer by applying a layer of a building material in powder form layer-wise on a support or an already existing layer of the building material by means of a recoater and by solidifying the building material in parts by a supply of heat to those positions of the layer that correspond to the cross-section of an object by selectively scanning the layer with energy radiation. The method according to the invention comprises at least the following steps:

a step of accessing data of a layer to be applied in a first dataset, in which first dataset for each layer to be applied during the manufacturing it is indicated, whether in such layer there shall be a selective solidification of building material and, if that is the case, at which positions in such layer building material shall be solidified, a step of dividing the area of the layer to be applied into subareas, a step of assigning weighting factors to the subareas and a step of specifying an amount of building material to be supplied to the recoater for the application of the layer. in particular, the amount of building material is determined based on the weighting factors assigned to the individual subareas and is provided as building material consumption information.

By the method according to the invention it is taken into account that the building material requirements may be different at different positions: For example, if the building field that is laterally defined by the building chamber and the process chamber, respectively, is circular, however, the recoater moving across the building field is rectangular, at the margin of the building field, meaning where the building field across which the recoater moves has a small extent in the direction of movement of the recoater, there will be needed less building material than in the center. Here, the approach according to the invention can precisely determine the building material requirements particularly in those cases, in which the amount of building material is tightly rated, so that the risk of a premature depletion of the building material during the layer application is counteracted. Subareas of a layer to be applied over which the center (with respect to a direction perpendicular to the direction of movement of the same) of the recoater passes when a layer is applied, in the mentioned case would be for example assigned a higher weighting factor in order to guarantee that the amount of building material is at least so large that a complete recoating is made possible in these subareas. In contrast, subareas over which the margin (with respect to a direction perpendicular to the direction of movement of the same) of the recoater passes when a layer is applied, would be assigned a lower weighting factor as an insufficient powder layer application would not have such severe effects there.

The provision of the building material consumption information according to the invention makes it possible to dose the building material for a manufacturing process as economically as possible, which leads to cost savings. Furthermore, if necessary, information on the presumably needed total building material need during the manufacturing process may be provided already before the start of a manufacturing process (the total building material need is determined from the building material need for all layers). Then, by means of this information, if necessary, the objects to be manufactured can be arranged in a different way in the building field or a different shape of the building field may be chosen in order to keep the necessary building material amount for the manufacturing of the desired object as small as possible. After all, the method may provide the building material consumption information already at such an early time that based on this information it could be decided to carry out the building process on a differently dimensioned additive manufacturing device than the one originally scheduled therefore in order to minimize the building material consumption, if necessary. In summary, it can be stated that due to the very precise building material consumption information provided according to the invention, an optimization potential may be achieved that may be used for example by appropriate means with respect to an arrangement and/or a design of the manufactured objects on a building field and/or a design of the building field itself.

Preferably, the amount of building material is specified depending on a sum of the weighting factors of all subareas. If in such a case the amount of building material to be supplied to a subarea to which the weighting factor 1 is assigned is regarded as standard building material amount, the amount of building material that is needed in total for the application of a layer may be determined in a simple way by a summation of the weighting factors of all subareas and a subsequent multiplication with the standard building material amount. Here, by the individual weighting factors also different sizes of the subareas can be taken into consideration.

Further preferably, the subareas cover the area of the layer to be applied by forming an array of rows and columns. In such a way differing building material needs parallel to a recoating direction and perpendicular thereto may be taken into consideration in a very simple way. Here, subareas result in the form of cells and (enlarged) pixels, respectively, that are defined by the rows and columns and can be individually weighted with the help of weighting factors.

Preferably, the weighting factors assigned to the subareas are assigned such that they are monotonically increasing, preferably strictly monotonically increasing, in the direction of movement of the recoater. Here, the inventors have recognized that when the building material in the recoater is running low, this need not happen abruptly but may happen gradually. In other words, a building material supply in the recoater that is running low during a layer application may lead to the situation that the predefined thickness of the applied layer is underrun more and more towards the end of the recoating process. In case an object is positioned in an area of the building field that is traversed at the start of the recoating process, the risk of an insufficient layer application for such an object is lower than in an area of the building field that is recoated only towards the end of the recoating process. Therefore, if an object is positioned in an area of the building field that is recoated only towards the end of the recoating process, for such an object the amount of building material to be stored for a layer application has to be increased. This can be taken into consideration by assigning a higher weighting factor to subareas of the layer over which the recoater passes at a later time during a recoating process.

In a variation of the method according to the invention the positions and shapes of regions to be solidified in at least one previous layer, preferably the immediately preceding layer, are determined, and in case in at least one previous layer, preferably the immediately preceding layer, there exists a solidified region, those subareas of the layer to be applied that are located at least partially above of a solidified region are assigned a higher weighting factor as compared to the case, in which the subarea is not located at least partially above of a solidified region.

By this variation of the method according to the invention, when determining the building material need for a layer, it is taken into account that in addition to the necessary amount of building material for the application of a layer with a predefined thickness d an additional amount of building material is needed, which additional amount of building material serves for levelling impressions in the immediately preceding building material layer. Impressions in the immediately preceding building material layer result from a compaction of the building material at the solidified positions in the immediately preceding layer or in layers thereunder. In the approach according to the invention, also the position of a solidified region may be taken into account. Namely, depending on the position of this solidified region the building material need may be different. If for example the solidified region is recoated only towards the end of the recoating process, it is more important to store enough additional building material for this region, so that at this position there is sufficient building material available for the application with the predefined layer thickness.

In a modification of the just described variation of the method according to the invention the subareas are arranged such that the area of the layer to be applied is divided into rows running in parallel to the direction of movement of the recoater and columns running orthogonally thereto, wherein at first in each row the sum of the weighting factors of all subareas in that row is calculated and afterwards the row having the maximum sum is determined. Afterwards, all subareas in a column are assigned a value of the weighting factor of such subarea in this column that lies in the row having the maximum sum. Thus, in this approach at first the row with the maximum building material need is identified and afterwards the required building material amount is specified under the assumption that also in all other rows this maximum amount would be required. Such an approach will lead to an identified building material need that is slightly too high, however, by such an approach one may guard against unexpected building material losses or unintended building material losses during a layer application.

In a further modification of the described variation of the method according to the invention the positions and shapes of solidified regions in at least one previous layer, preferably the immediately preceding layer, are simulated with respect to a state after a solidification thereof by means of energy radiation, wherein for the assignment of weighting factors to subareas it is taken into consideration, whether a subarea lies at least partially above of a solidified region provided by the simulation. Such an approach makes a more accurate determination of the building material need possible, as it is taken into account that the extent of a region to be solidified in a layer may deviate from the actual extent of a region after its solidification as a result of the manner of the solidification process. Here, according to the invention in the simulation of the extent of the solidified region also volume reduction occurrences due to the solidification process of the building material may be simulated, if necessary.

In the simulation of positions and shapes of solidified regions in at least one previous layer, preferably the immediately preceding layer, an image of a solidified region is computed referring to a state after a solidification of such region. thereby, the extent of a solidified region may be determined in a particularly accurate way.

Preferably, the subareas are stripes running in parallel to the direction of movement of the recoater across the whole layer to be applied. Thereby, the assignment of weighting factors is simplified as a waiting factor is assigned only to each stripe.

In this way in particular the extent in the recoating direction of the region to be solidified after the layer application and/or the extent in the recoating direction of an already solidified region in previous layers may be taken as a basis for the assignment of the weighting factors.

Preferably, in the assignment of values of weighting factors to the subareas the type of building material that is used is taken into consideration. The reason is that usually the influence of the position and orientation of already solidified regions or regions still to be solidified after a layer application will be different for different powder materials. According to the just described approach this circumstance is automatically taken into account in the assignment of weighting factors.

An inventive method of providing a control command set for the manufacturing of at least one three-dimensional object by means of a layer-wise additive manufacturing device, wherein in the layer-wise additive manufacturing device the at least one object is manufactured layer by layer by applying a layer of a building material in powder form layer-wise on a support or an already existing layer of the building material by means of a recoater and by solidifying the building material in parts by a supply of heat to those positions of the layer that correspond to the cross-section of an object by selectively scanning the layer with energy radiation, comprises at least the following steps:

Apart from the provision of the building material consumption information by means of an inventive method described above, a control command set for the layer-wise additive manufacturing device is generated, wherein in the control command set for at least one, preferably several, especially preferably for each, layer to be applied the amount of powder to be supplied to the recoater for the application of this layer is specified.

Thus, in the just described method a control command set for a layer-wise additive manufacturing device may be obtained, which automatically and very precisely determines the building material need for the application of a layer and controls the layer-wise additive manufacturing device correspondingly.

In an inventive method at least one three-dimensional object is manufactured by means of a layer-wise additive manufacturing device that is controlled by a control command set generated by means of a the inventive method, wherein in the layer-wise additive manufacturing device (1) the at least one object is manufactured layer by layer by applying a layer of a building material in powder form layer-wise on a support or an already existing layer of the building material by means of a recoater and by solidifying the building material in parts by a supply of heat to those positions of the layer that correspond to the cross-section of an object by selectively scanning the layer with energy radiation and the method comprises at least the following steps:

- a powder application step of providing a layer of a building material in powder form on a support or an already existing layer of the building material in powder form,
- a solidification step of solidifying the applied layer by means of electromagnetic radiation or particle radiation, in which solidification step the radiation acts on all positions of the layer to be solidified, so that the powder grains at these positions are partially or completely melted by the heat energy introduced by the radiation, so that after a cooling they exist connected to each other as solid state body,
- wherein the powder application step and the solidification step are successively repeated until all cross-sections of the at least one three-dimensional object to be manufactured are solidified. A just described method of manufacturing of objects by means of a layer-wise additive manufacturing device may use the available building material in a particularly effective way. In the end, due to the economical use of the building material the costs for the manufacturing of objects may be lowered.

An inventive provision unit for providing a building material consumption information (AMI) in the context of a manufacturing of at least one three-dimensional object by means of a layer-wise additive manufacturing device, wherein in the layer-wise additive manufacturing device the at least one object is manufactured layer by layer by applying a layer of a building material in powder form layer-wise on a support or an already existing layer of the building material by means of a recoater and by solidifying the building material in parts by a supply of heat to those positions of the layer that correspond to the cross-section of an object by selectively scanning the layer with energy radiation, wherein the provision unit comprises at least:

- an access unit designed to access the data of a layer to be applied in a first dataset, in which first dataset for each layer to be applied during the manufacturing it is indicated, whether in such layer there shall be a selective solidification of building material and, if that is the case, at which positions in such layer building material shall be solidified,
- a division unit, which in operation divides the area of the layer to be applied into subareas,
- an assignment unit, which in operation assigns weighting factors to the subareas,
- a specification unit for specifying an amount of building material to be supplied to the recoater for the application of the layer,
- wherein the provision unit is designed to determine the amount of building material based on the weighting factors assigned to the individual subareas and to provide the same as building material consumption information.

The provision unit may be implemented as separate unit, however, it may also be integrated into a layer-wise additive manufacturing device. Interfaces in the provision unit need not necessarily be configured as hardware components.

They can also be implemented as software modules, for example when information and data, respectively, need to be passed to a following component of the provision unit and to an external component, respectively, only by means of software. Also, the interfaces may consist of hardware and software components such as a standard hardware interface that is specifically configured by means of software for the particular application. Furthermore, several interfaces may be combined to one common interface such as an input-output interface.

All in all, a large part of the components for implementing the provision unit in the inventive way, in particular the access unit, the division unit, the assignment unit and the specification unit may be implemented completely or in part in the form of software modules on a processor.

An inventive provision unit enables the building material need determination remote from a layer-wise additive manufacturing device on which the building process shall run in the end. Thereby, the provision unit can be used for example already at the design stage of objects in order to determine the manufacturing costs of an object, which manufacturing costs depend on the required powder need for a building process.

An inventive layer-wise additive manufacturing device for manufacturing at least one three-dimensional object from a building material in powder form layer by layer by applying a layer of a building material in powder form layer-wise on a support or an already existing layer of the building material by means of a recoater and by solidifying the building material in parts by a supply of heat to those positions of the layer that correspond to the cross-section of an object by selectively scanning the layer with energy radiation, comprises:
 a support for supporting the object to be formed;
 a recoater for applying a layer of the building material in powder form on the surface of the support or an already existing layer,
 an irradiation device that emits electromagnetic radiation or particle radiation and is able to irradiate all positions to be solidified in a layer such that the powder grains at these positions are melted partially or completely by the heat energy introduced by means of the radiation, so that after a cooling the powder grains at these positions exist connected to each other as solid state body, wherein the layer-wise additive manufacturing device comprises a provision unit according to the invention and/or is connected to a provision unit according to the invention in terms of signalling. Thereby, a layer-wise additive manufacturing device according to the invention makes it possible to carry out manufacturing processes of objects with a particularly effective use of the building material.

An inventive computer program is able to be loaded into a provision unit and has program code means for carrying out all steps of a method of providing a building material consumption information according to the invention, when the computer program is executed in the provision unit.

BRIEF DESCRIPTION OF THE DRAWINGS

Features and practicalities of the invention will be described in the following by means of embodiments making reference to the drawings, wherein the figures show.

DETAILED DESCRIPTION OF THE EMBODIMENTS

Figure 1:
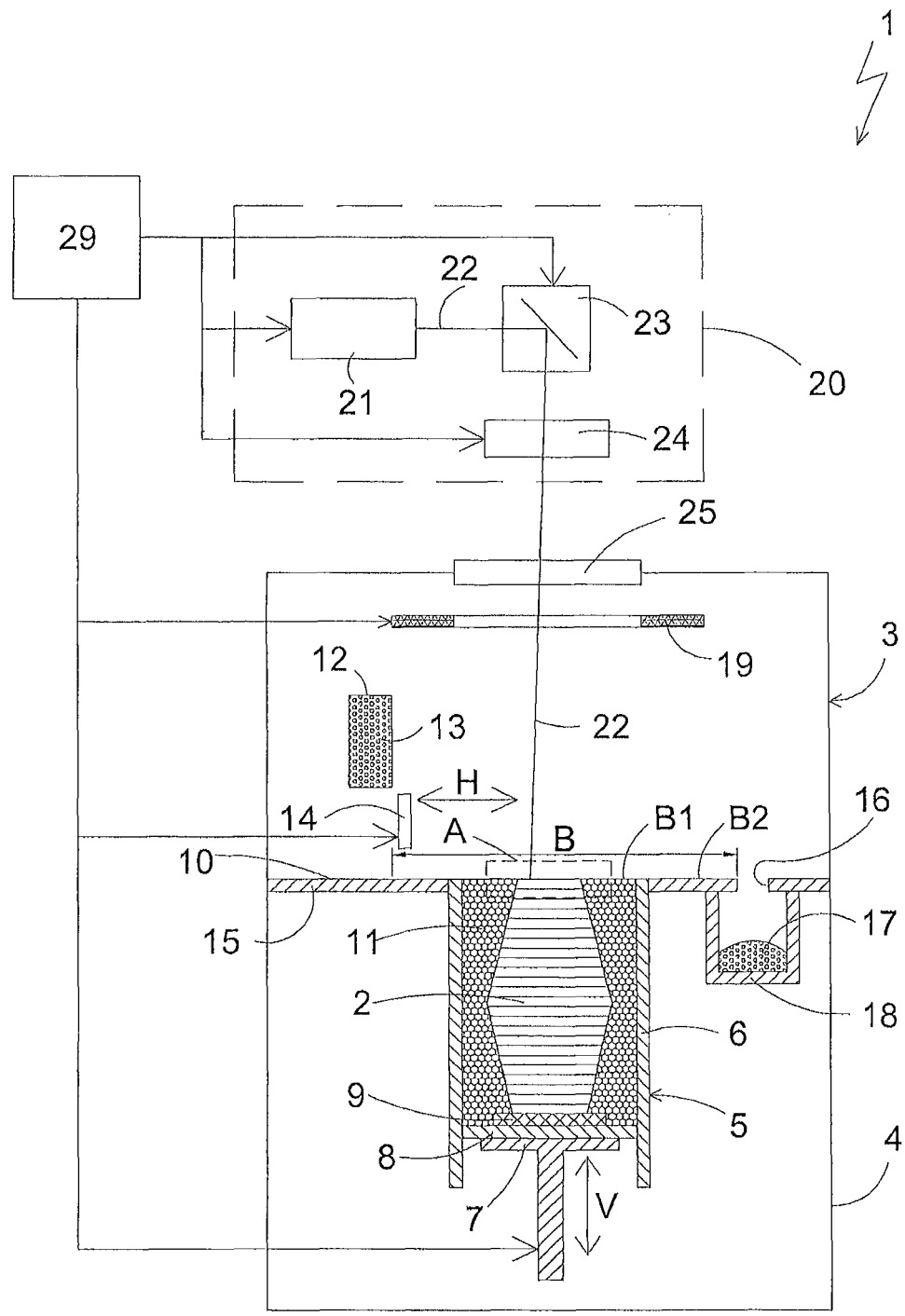
FIG. 1 is a representation of an example of a layer-wise additive manufacturing device according to the invention.

In the following, an example of a layerwise additive manufacturing device 1 according to the invention is described with reference to FIG. 1. The device shown in FIG. 1 is a laser sintering or laser melting device 1. In order to build an object 2, the device comprises a process chamber 3 having a chamber wall 4.

A container 5, which is open to the top and has a wall 6, is arranged in the process chamber 3. A support 7 that is movable in a vertical direction V is arranged in the container 5. A base plate 8 is arranged at the support 7 and forms the bottom end of the container 5 and thereby forms its bottom. The base plate 8 may be a plate formed separately from the support 7, which is attached to the support 7, or it may be formed integrally with the support 7. Depending on the powder and the process that are used, a building platform 9 may be additionally attached on the base plate 8, on which building platform 9 the object 2 is built. However, the object 2 may also be built on the base plate 8 itself, which base plate 8 then serves as building platform. In FIG. 1, the object 2 to be formed on the building platform 9 in the container 5 is shown below a working plane 10 defined by the upper edge of the wall 6 in an intermediate state with several solidified layers that are surrounded by building material 11 that remained unsolidified.

Furthermore, the laser sintering device 1 comprises a storage container 12 for a building material 13 in powder form that is solidifiable by electromagnetic radiation and a recoater 14 that can be moved in a horizontal direction H for applying the building material 13 on the working plane 10. A work plate 15 that surrounds the container 5 on all sides and is preferably thermally insulated from the container, is arranged such that its upper surface lies within the working plane 10. In the work plate 15 an overflow slit 16 is arranged at the side opposed to the storage container 12. Surplus powder 17 may fall through the overflow slit 16 into an overflow container 18. Furthermore, a radiative heating 19 for heating the building material 13 applied on the working plane 10 is arranged in the process chamber.

Furthermore, the laser sintering device 1 comprises an exposure device 20 having a laser 21 that generates a laser beam 22, which can be deflected via a deflection device 23 and can be focused by a focusing device 24 through a coupling window 25 arranged in the top side of the wall 4 of the process chamber 3 onto the working plane 10.

Moreover, the laser sintering device 1 comprises a control unit 29, by which the individual components of the device 1 are controlled in a coordinated way for carrying out the building process. The control unit may comprise a CPU, the operation of which is controlled by a computer program (software). The computer program can be stored separately from the device on a storage medium, from which it can be loaded into the device, in particular into the control unit.

In operation, at first the support 7 is lowered by an amount that corresponds to the desired layer thickness in order to apply a powder layer. Then, by moving the recoater 14 across the working plane 10, a layer of the building material 13 in powder form is applied. Here, a designated recoating area B is defined as that region of the working plane 10 within which the recoater 14 is able to apply powder in an intended use, thus, in which its recoating function is possible. In the laser sintering device shown in FIG. 1, the designated recoating area B extends from the location at which the recoater 14 takes up building material in powder form from the storage container 12 up to the overflow slit 16 through which the surplus powder 17, which still remained in the recoater 14 at that position, falls into the overflow container 18. Beyond that position there is no recoating function possible.

The designated recoating area B covers the building field B1, meaning the region of the working plane 10 that lies within the upper opening of the container 5, and a margin region B2 surrounding the building field B1. Here, the building field B1 is the region in which the object 2 can be built and in which the applied and selectively solidified powder layers may be lowered before the application of a new powder layer.

The applied powder layer is pre-heated by the radiant heating 19 that is designed to heat the whole building field B1. Also a part of the work plate 15 is heated by the radiant heating 19. However, the work plate 15 may in addition also be heated by a dedicated heating element (not shown in the figure) attached to it.

Subsequently, the cross-section of the object 2 to be manufactured is scanned by the laser beam 22, so that the building material 13 in powder form is solidified at the positions that correspond to the cross-section of the object 2 to be manufactured. These steps are repeated until the object is completed and can be removed from the building space.

Figure 2:
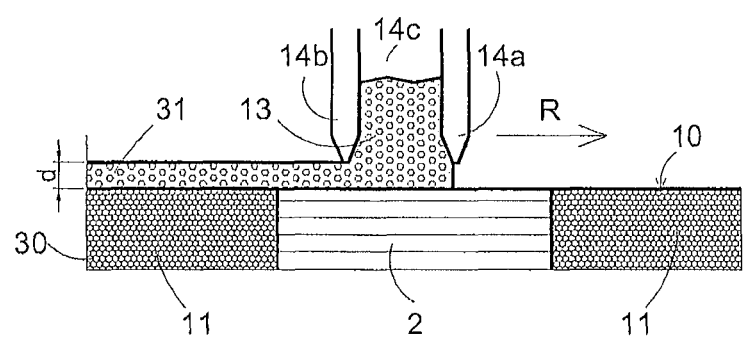
FIG. 2 is a cross-sectional view for illustrating the application of a powder layer in a layer-wise additive manufacturing method.

FIG. 2 shows schematically enlarged a detail A, which is surrounded by a dashed line in FIG. 1.

After the application and solidification of a powder layer 30 the solidified part of the object 2 to be manufactured therein is surrounded by powder 11 that remained unsolidified. Then, by means of a movement of the recoater 14 in a recoating direction R a further powder layer 31 of the building material 13 is applied on this previously applied and selectively solidified powder layer 30.

As shown in FIG. 2, the recoater 14 comprises a recoating unit having a blade positioned forward facing in the recoating direction R (front blade 14a) and a blade positioned backward facing in the recoating direction B (rear blade 14b). These two blades at least partially delimit an intermediate space 14c in the recoating direction B and in the opposite direction to the recoating direction. This intermediate space 14c defined by the two blades 14a, 14b is designed to accommodate a supply of building material 13 in powder form. Perpendicular to the drawing plane the two blades 14a, 14b and thus also the intermediate space 14c defined by them extend across the whole width of the area to be recoated.

When moving the recoater 14 in the recoating direction R, a portion of this building material 13 in powder form remains on the immediately preceding layer 30 and is drawn out to a uniform thin powder layer 31 having the thickness d by the rear blade 14b. The applied layer thickness is defined by the difference in height between the lower edge of the rear blade 14b and the previously applied layer 30.

In order to apply the new powder layer 31, the recoating unit 14a-c of the recoater 14 at first moves to the storage container 12 and takes up there a predetermined amount of the building material 13 in powder form. This predetermined amount of powder is preferably larger than the amount of powder necessary for applying a layer of the building material 13 in powder form. Then, the recoating unit 14a-c moves over the working plane 10 and applies the new powder layer 31. When the recoating unit 14a-c reaches the overflow slit 16, surplus powder 17 having still remained in the recoater 14 falls there into the overflow container 18.

As already mentioned in the introduction, the costs of a manufacturing process by means of a layerwise additive manufacturing device are affected very much by the amount of building material that must be used for the manufacturing process. In this respect, the inventors have found that the expected material consumption in the manufacturing of one or several objects depends on the position and orientation of the objects in the building space. In order to be able to determine the expected powder need as precisely as possible and be able to take into account the just described dependency of the powder need on the position and orientation of the objects to be manufactured, the inventive method for determining the powder need proceeds as follows:

Before the application of a layer of a building material in a layerwise additive manufacturing method all information for this layer and the previous layers, meaning in particular the layer thickness and the position, extent and orientation of the regions to be solidified, exist in a dataset.

In a first approximation, the building material needed for one layer depends on the area of the designated recoating area B as well as on the thickness d of the layer to be newly applied. A compaction of the powder material generated by the layer application, which compaction leads to the fact that powder has to be applied with a larger layer thickness than the intended thickness d, is known to the skilled person and is not explained here in detail. Whether such a compaction by the layer application is taken into account or not has no influence on the applicability of the present invention.

Figure 3:
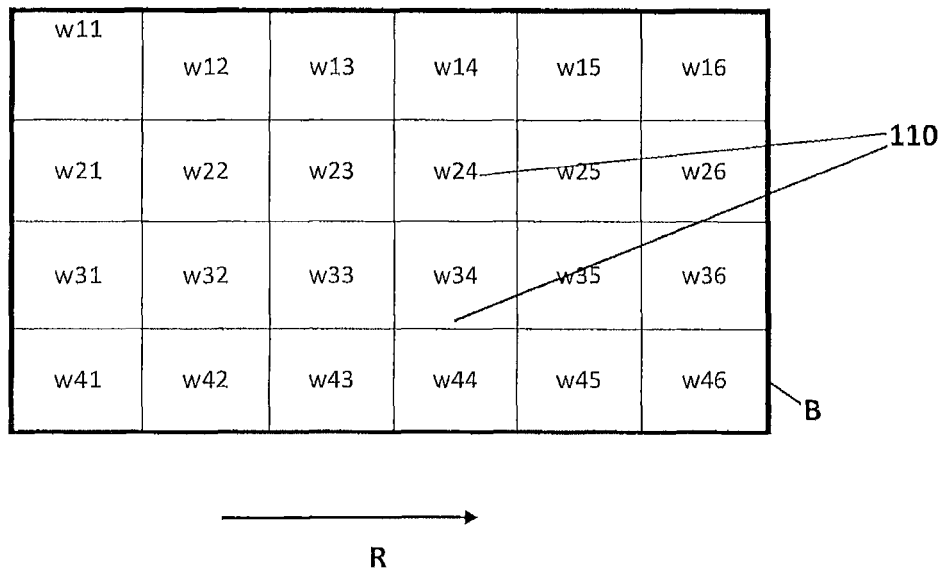
FIG. 3 shows an exemplary inventive division of the area of a layer to be applied into subareas and the assignment of weighting factors to the subareas.

According to the invention the powder need for a layer is determined more precisely by dividing the area of the layer to be applied, meaning in particular the designated recoating area B, into subareas and assigning weighting factors to these subareas, which weighting factors express the extent of the powder need for a subarea. In the following, the approach is explained by referring to FIG. 3:

FIG. 3 shows a top view of the designated recoating area B. The recoating direction, meaning the direction in which a recoater 14 moves across the recoating area B for applying a powder layer, is indicated by an arrow R. it can be seen that the recoating area is divided into 4×6 subareas 110. A weighting factor $w_{ij}$ is assigned to each of the subareas 110, which weighting factor embodies the powder need in a powder application in this area. Here, according to the invention it is assumed that there exists a standard powder need per unit area, which standard powder need per unit area can be determined based on the above described first approximation taking into account the layer thickness d and which standard powder need per unit area depends on the building material that is used. For example, a weighting factor having the value 1 could be assigned to a subarea 110 having the size of a unit area. The weighting factors $w_{ij}$ then could for example be chosen the larger the larger the areas of the respective subareas 110. However, in FIG. 3 such an approach would not yet lead to different weighting factors as the areas of all subareas 110 are chosen to be of the same size.

Due to the introduction of weighting factors, the powder need for the application of a layer can be determined by summing the weighting factors of all subareas 110 and subsequently multiplying the sum with the standard powder need per unit area. The result obtained then corresponds to the amount of powder needed for the application of the current layer or at least is proportional to the same.

When assigning weighting factors to the subareas 110, there exist different approaches. Exemplary criteria that may be followed when doing so will be described in the following within the context of different embodiments of the invention. Here, each of the embodiments shall only describe an example for a possible approach. In particular, it is also possible to combine the approaches described in the individual embodiments in order to arrive thereby at (thus possibly more refined, i.e. more accurate) weighting factors that are a consequence of several criteria. Furthermore, specifically shown numerical values for the weighting factors are only examples for explaining the approach. The skilled person may choose other numerical values in a particular case depending on the significance for the building material need he wishes to attach to the different influencing factors. In particular, the examples for influencing factors on the building material need make no claim to be exhaustive. The assignment of weighting factors for the determination of the building material need according to the invention is generally applicable, meaning also in cases in which further quantities influencing the building material need that are not described here shall be taken into account.

First Embodiment

Figure 4:
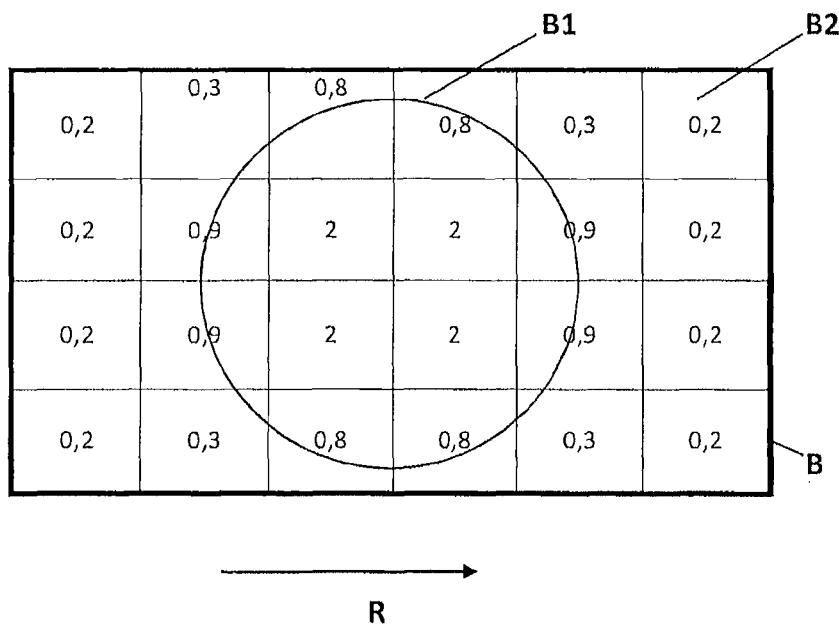
FIG. 4 shows a top view of the recoating area in a case, in which the building field has a shape deviating from the recoating region.

In the first embodiment, by the assignment of weighting factors it is taken into account that within the designated recoating area B the powder consumption will be higher in the building field B1 than in the margin region B2 surrounding the building field B1. The reason for this is that within the building field the support 7 has been lowered before the application of a powder layer. In FIG. 4 the different powder need for the building field B1 and the surrounding region B2 is taken into account by different weighting factors. For example, one can recognize that the highest weighting factors can be found inside of the building field and that those subareas 110 that cover the building field B1 only with a part thereof have weighting factors that are increased with respect to those in the region surrounding the building field B1, however, have lower values than the values for subareas 110 which completely lie within the building field B1. In particular, it can be also seen in the figure that the powder need in the recoating direction R is different for the four rows that are shown, which results in a simple way from a summing up of the weighting factors in a row. This expresses the fact that those regions of the recoater which pass only over small areas of the building field B1 must accordingly store fewer powder.

Second Embodiment

According to the invention it was recognized that building material can also be saved when only a part of the designated recoating region B is actually traversed by the recoater 14. Such an approach may be of use when the objects to be manufactured do not fill the complete building field. Thus, in such a case a layer need not be applied within the complete building field.

Figure 5A:
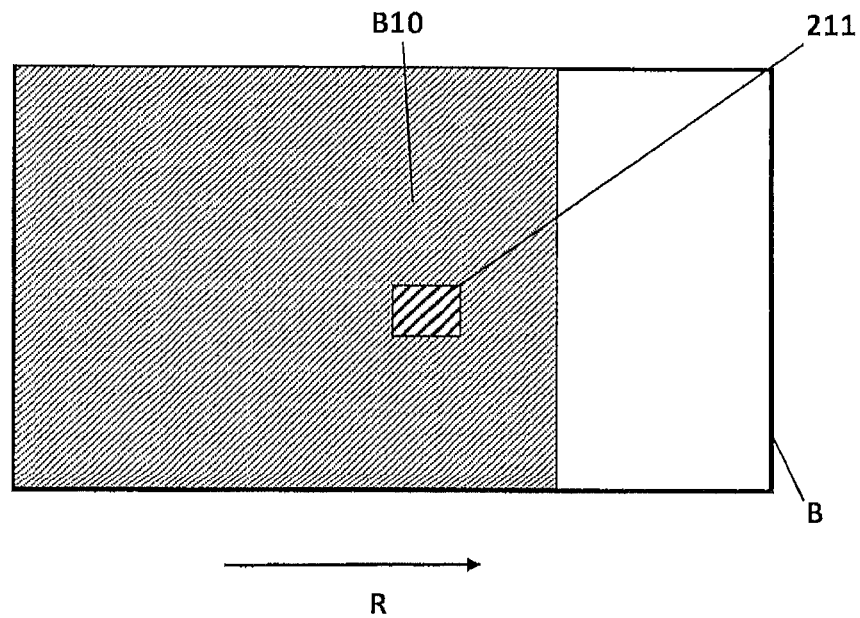
FIGS. 5a and 5b serve for an explanation of the influence of the position of a cross-section to be solidified in the building field on the powder consumption.
Figure 5B:
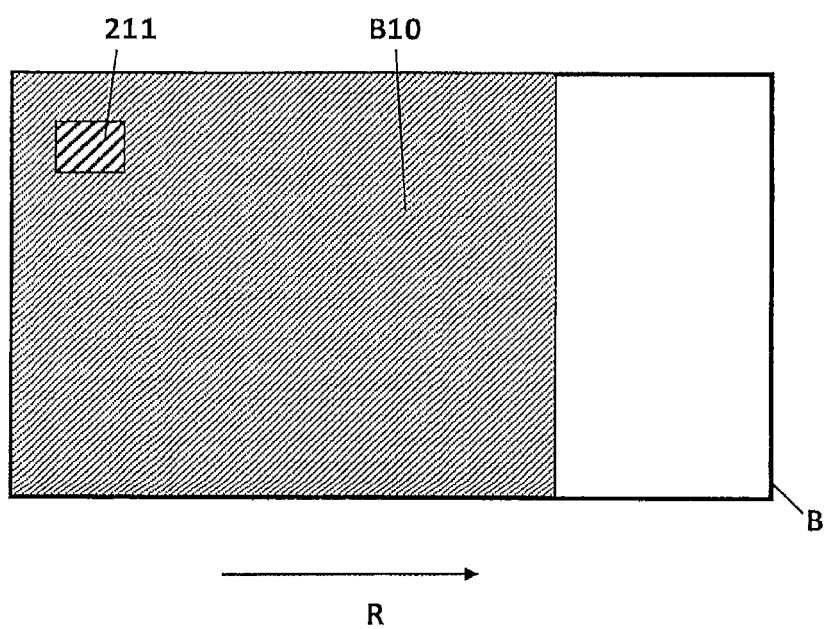

In order to illustrate the approach, FIG. 5a shows a top view of the designated recoating area B. Again the recoating direction is indicated by the letter R and an arrow. The reference sign 211 designates the cross-section of an object to be manufactured, which in the example of FIG. 5a is a tower like object having a cross-sectional area that is considerably smaller than the area of the designated recoating area and the area of the building field B1, which is e.g. rectangular (the latter is not shown). In such building situations the powder need strongly depends on the position of the object within the recoating region, as is apparent from a comparison of FIGS. 5a and 5b. Here, FIG. 5b is analogous to FIG. 5a. Only the position of the cross-section 211 is shifted opposite to the recoating direction R. Any additionally existing shifting perpendicular to the recoating direction is not relevant for the explanation.

If the building material is not applied in the whole designated recoating area B, this means that the supply in the recoater 14 is allocated such that it will be depleted before the recoater arrives at the end of the designated recoating area B (in FIGS. 5a and 5b at the right). Here, the inventors have found that the applied layer thickness cannot abruptly drop to the value zero when the powder supply in the recoater 14 is running low. Rather, the applied layer thickness may drop gradually, so that the building material will be applied with a smaller thickness than the intended layer thickness d. Furthermore, the building material may be inadvertently distributed nonuniformly transverse to the recoating direction, so that at different positions transverse to the recoating direction it runs out at different points in time. From this it results for the case of FIG. 5a that it has to be ensured that there is still enough powder reserve in the recoater for applying the powder with the specified layer thickness d in the region of the cross-section 211, though this location is reached only towards the end of layer application process. In contrast to this, in FIG. 5b the recoater passes over the cross-section 211 already at the start of the recoating process, so that there are no negative effects, if at the end of the recoating process the powder is running low.

Figure 6:
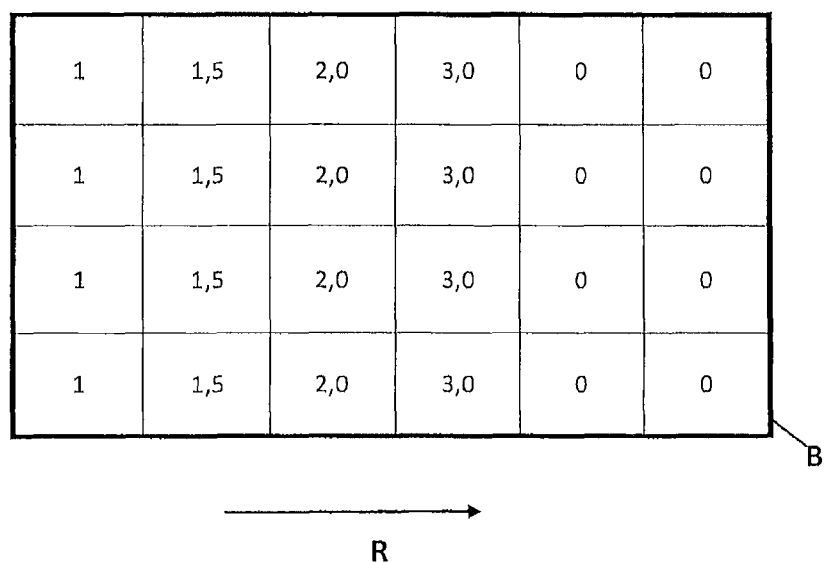
FIG. 6 shows an exemplary assignment of weighting factors in a building situation represented in FIGS. 5a and 5b.

In general, the weighting factors can for example be determined as shown in FIG. 6. FIG. 6 shows again a top view of the designated recoating area B for a building situation as shown in FIGS. 5a and 5b. It can be seen that in the two right columns in FIG. 6 the subareas 110 are assigned the weighting factor 0, which expresses the fact that in this region no powder has to be applied. Furthermore, in the first four columns a strictly monotonic increase of the weighting factors from left to right can be recognized. By such an assignment of weighting factors it is taken into account that in order to ensure a sufficient layer application at the positions which are recoated at a later point in time during the movement of the recoater, sufficient powder needs to be in the recoater.

In the end, it results that for an arrangement of the object to be manufactured in a way shown in FIG. 5a the powder consumption will be higher than for an arrangement of the object in a way shown in FIG. 5b.

Third Embodiment

The third embodiment illustrates a further aspect that can be taken into account in the assignment of weighting factors to the individual subareas 110, into which the designated recoating area B has been divided.

Figure 7:
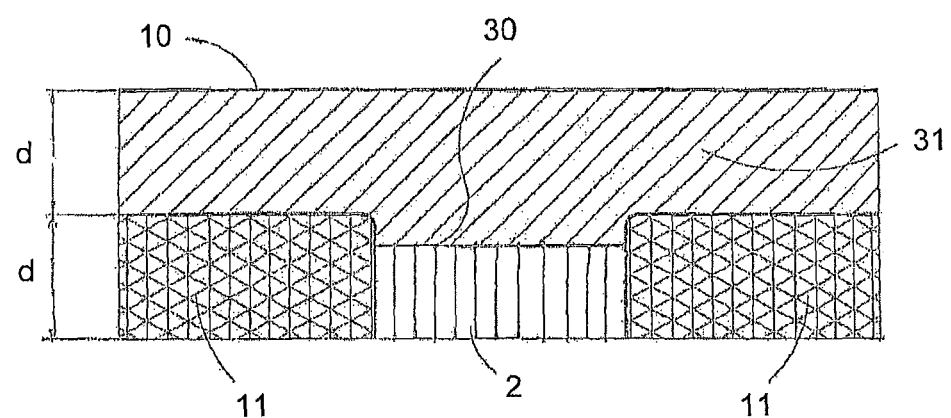
FIG. 7 is a cross-sectional view for illustrating the influence of solidified regions on the building material need.

FIG. 7 shows a cross-sectional view of the upper part of the object 2 during its manufacturing. One recognizes a newly applied building material layer 31 above of a preceding layer in the building process consisting of non-solidified building material 11 that is laterally flanking a solidified portion in the region of the object 2 in this preceding layer.

As can be clearly seen in FIG. 7, the surface of the object 2 lies below the surface of the powder 11 that remained unsolidified, so that at this position a depression is formed. The reason for this is the material densification by the melting and softening, respectively, process of the building material during the solidification.

As can also be seen in FIG. 7, in the depression region more powder must be applied. At this position the thickness of the new powder layer is larger than the predetermined layer thickness d. When the building material need for the newly applied layer 31 is determined, the additional powder need above of already solidified regions can be taken into account in the determination of the powder need by an appropriate assignment of weighting factors.

Figure 8A:
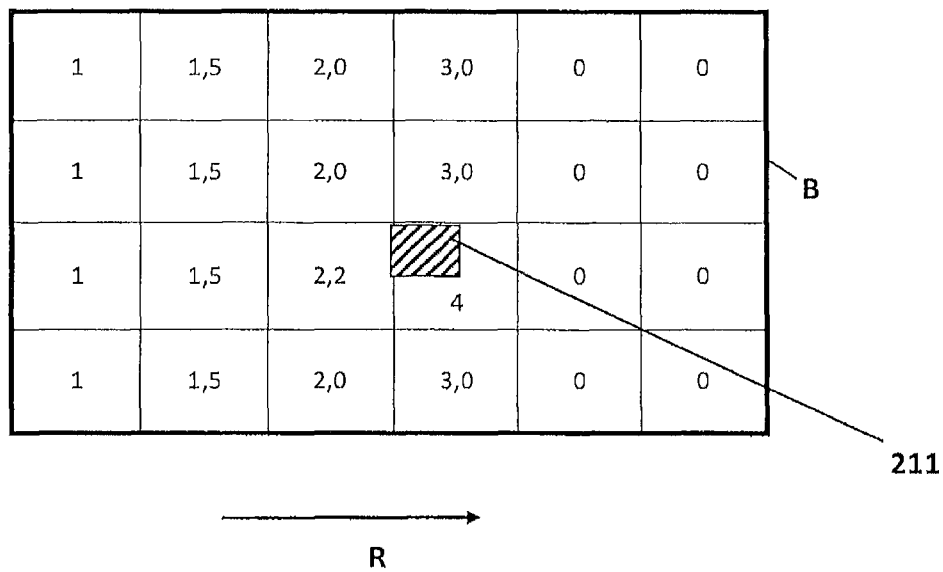
FIGS. 8a and 8b show an exemplary assignment of weighting factors in a building situation shown in FIGS. 5a and 5b taking additionally into account solidification processes in previous layers.
Figure 8B:
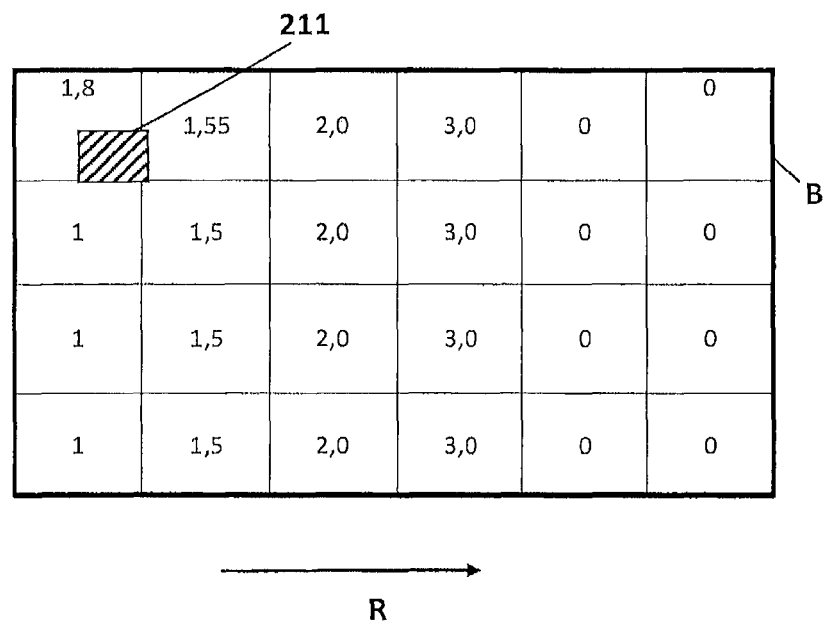

For this, the layer data for the preceding layer are accessed, from which layer data the position, size and orientation of the regions to be solidified in the preceding layer are apparent. FIGS. 8a and 8b exemplarily show an assignment of weighting factors taking into account the additional amount of powder needed for a cross-section 211 already solidified in the preceding layer. The object cross-sections 211 in FIGS. 8a and 8b are chosen to be analogous to the object cross-sections shown in FIGS. 5a and 5b. As can be seen in FIGS. 8a and 8b, the weighting factors are increased in those subareas 110 that cover a part of the object cross-section depending on the area that is covered. Compared to the second row, the weighting factor in e.g. the first row and the first column in FIG. 8b is increased by a remarkably larger value as it is the case for the weighting factor in the first row and the second column. Again it can be seen, that the subareas that cover the object cross-section in FIG. 8a are assigned a considerably higher weighting factor than the subareas covering the object cross-section in FIG. 8b. This in turn reflects the influence of the recoating time during the recoating process on the powder need. Of course, however, by the assignment of appropriate weighting factors the additional powder need for an already solidified region in the preceding layer may of course be taken into account also independently from the position of the region.

Figure 9A:
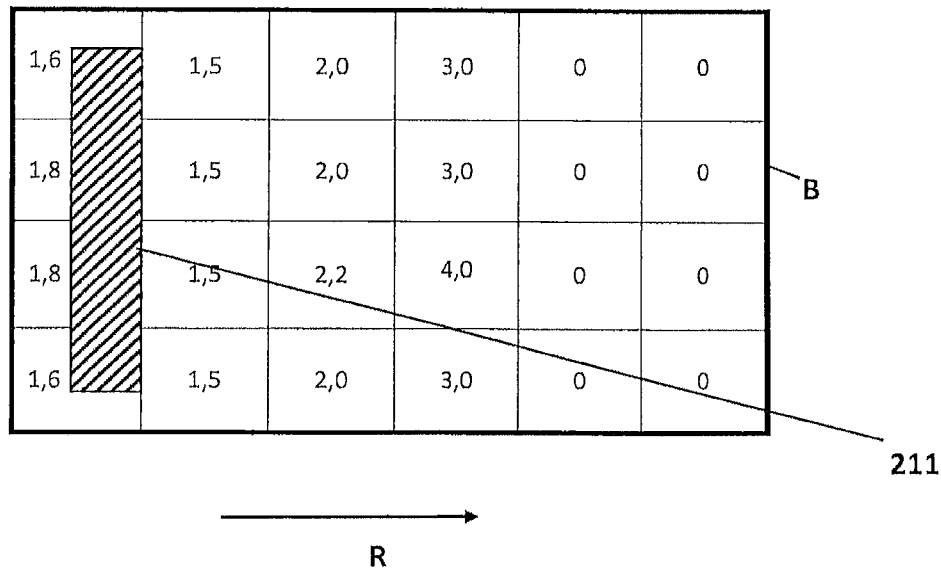
FIGS. 9a and 9b show an exemplary assignment of weighting for illustrating the influence of the orientation of an object to be manufactured on the building material need.
Figure 9B:
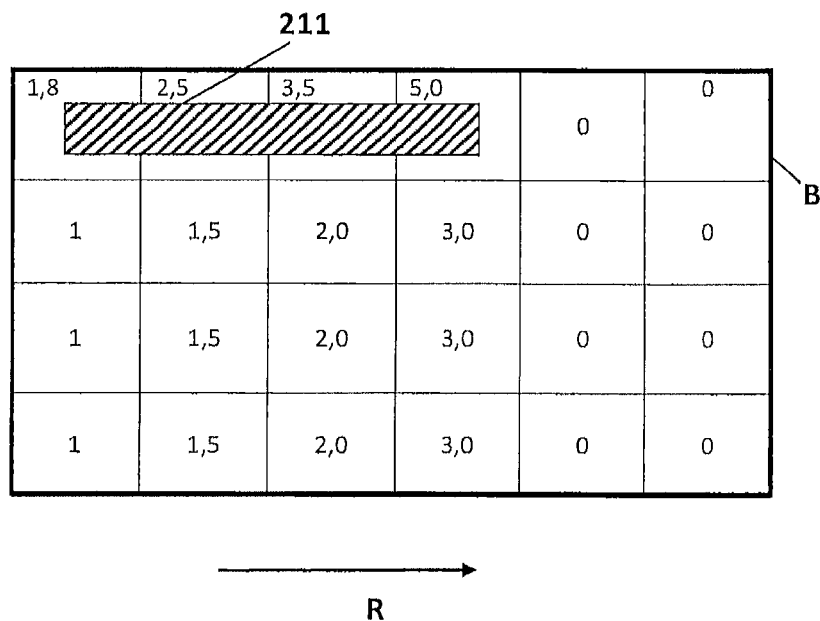

FIGS. 9a and 9b illustrate how the orientation of an already solidified object cross-section within the recoating area influences the powder need. As in FIG. 9b the already solidified object cross-section extends into areas that are recoated relatively late during the recoating process, the powder need in FIG. 9b is higher than for the situation in FIG. 9a. This can be easily seen by adding the weighting factors of those four subareas that in each case cover the solidified region. While in FIG. 9a a value of 6.8 results, a value of 12.8 is obtained for FIG. 9b.

It shall also be remarked that when the additional powder need for already solidified regions is taken into account, this is not necessarily coupled to a concomitant consideration of the position and orientation of the already solidified regions within the recoating area B. Rather, weighting factors can also be assigned by considering solely the extent of already solidified regions.

Though up to now only a consideration of already solidified regions in the preceding layer was mentioned, the invention is not limited thereto. Depressions in the immediately preceding layer, on which a new powder layer is applied for which the powder need is determined, may also be the result of solidification processes in layers still further below than the immediately preceding layer. As the data of all layers contain the respective information on the regions to be solidified, the position, extent and orientation of solidified regions in several previous layers can correspondingly be taken into account.

Figure 10:
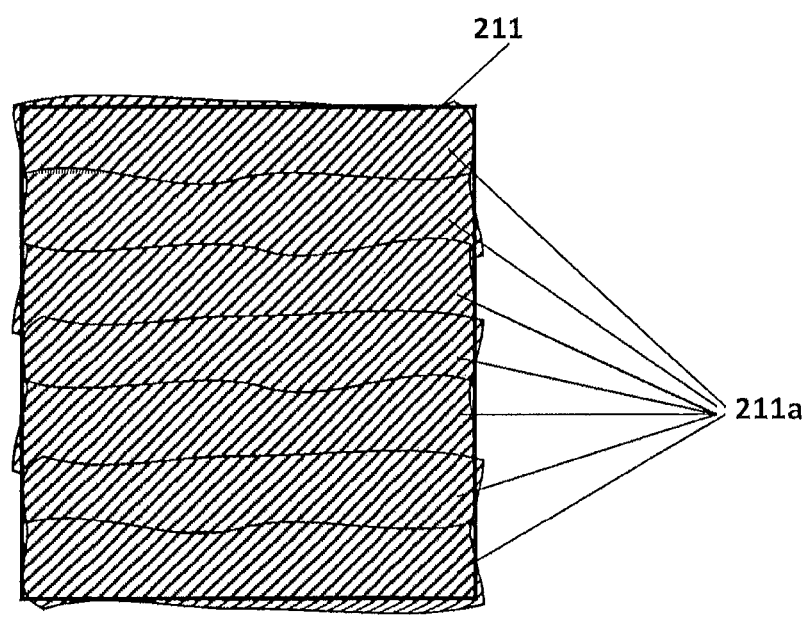
FIG. 10 shows a top view of a cross-section of an object to be manufactured, which cross-section is currently being manufactured in order to illustrate a possible approach for the simulation of the actually solidified region.

In a modification of the third embodiment the accuracy of the determination of the powder need can be increased further by taking into account that the extent of a region to be solidified in the data of a layer deviates slightly from the extent of the actually solidified region. This deviation results from the fact that the edges of the region to be solidified are slightly shifted in the solidification, which a.o. may depend on the heat dissipation at the edge of the region to be solidified. Furthermore, such a "fraying" at the edge of a region to be solidified may depend on the way the region to be solidified is scanned with an energy beam. This is illustrated in FIG. 10, which shows irradiation vectors 211a ("hatch vectors") by which the cross-section 211 to be solidified is scanned in the manufacturing process. It can be seen that the contour of the region 211 is not exactly reproduced. Finally, also the degree of densification during the solidification in the respectively chosen solidification process may be taken into account when determining the powder need.

One possibility of determining the extent of a solidified region in a layer by a simulation is calculating at first an image of the region to be solidified and covering then this image in the simulation by irradiation vectors (such as the irradiation vectors 211a in FIG. 10). In this way the solidification process with its effect on the extent of the region to be solidified is simulated. Of course, also other approaches are possible such as the multiplication of the area of a region to be solidified with a scaling factor that may for example have a value larger than 1. Based on the extent of a region to be solidified in a previous layer obtained by means of simulation, the additional powder need can then be determined for such a region and a weighting 15 factor for a subarea 110 in the layer above of such a region can be specified.

By the above approach it is in particular possible to take into account for the calculation of an image a beam solidification width that is actually to be expected after an irradiation of the building material with the energy beam instead of the width of the energy beam used during the solidification process. Furthermore, it can even be taken into account that the solidification behaviour may change when a region to be solidified is irradiated several times, meaning in particular is scanned several times with an energy beam. Advantageously, for the simulation of the solidification also pre-tests of the solidification behaviour of the building material to be used may be carried out in order to determine for example the expected beam solidification width in the layerwise additive manufacturing device to be used.

Figure 11:
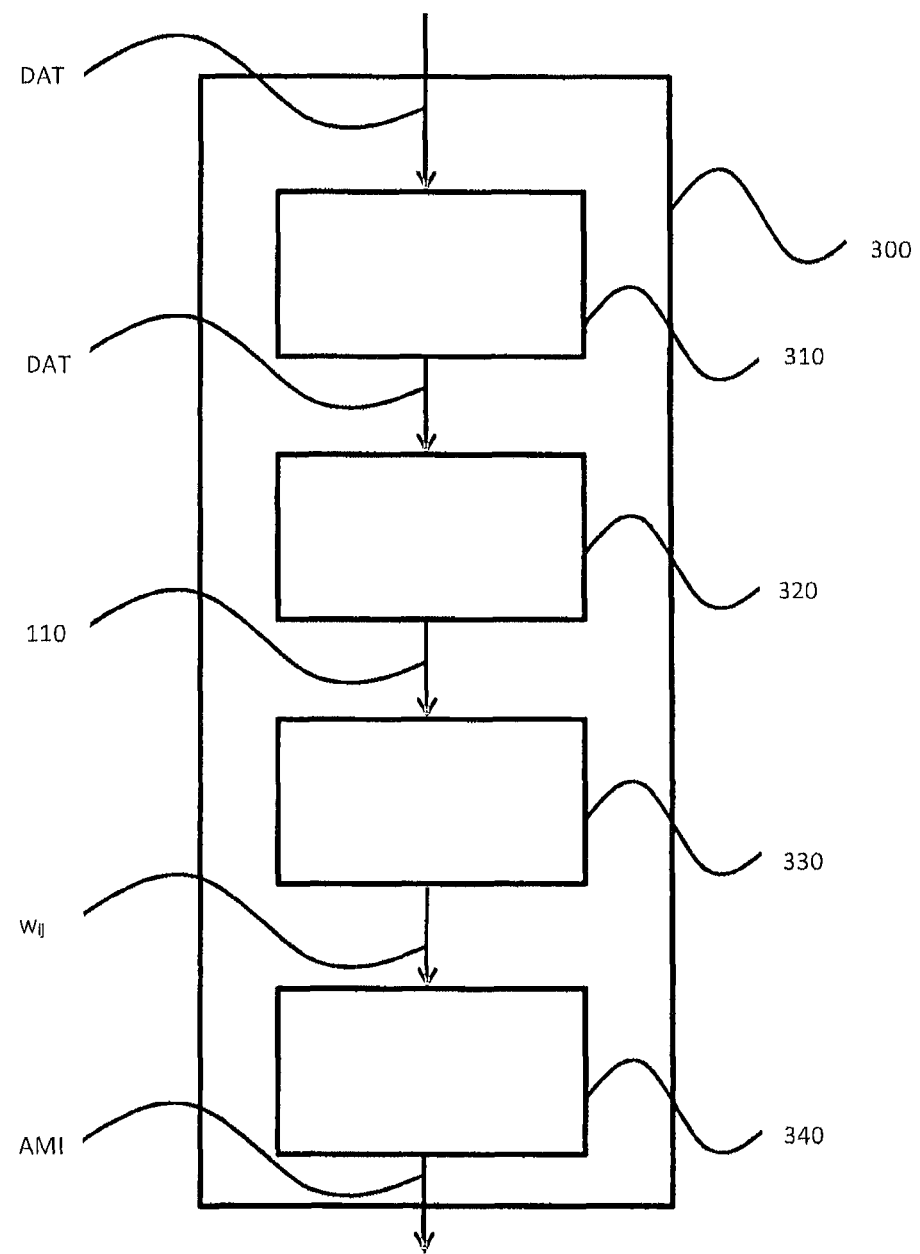
FIG. 11 shows a schematic block diagram for illustrating an embodiment of a provision unit according to the invention.

FIG. 11 shows a schematic block diagram of an embodiment of an inventive provision unit 300 for providing a building material consumption information in the context of a manufacturing of at least one three-dimensional object by means of a layerwise additive manufacturing device 1. In the layerwise additive manufacturing device 1, (as is exemplarily explained based on FIG. 1) the at least one object 2 is manufactured layer by layer by applying a layer of a building material in powder form layer-wise on the support 7 or an already existing layer of the building material, respectively, by means of a recoater 14 and by solidifying the building material in parts by a supply of heat to those positions of the layer that correspond to the cross-section of the object 2 by selectively scanning the layer with energy radiation 22. The provision unit 300 comprises an access unit 310, a division unit 320, an assignment unit 330 and a specification unit 340. Interfaces such as input, output or internal data transfer interfaces of the provision unit 300 are omitted for clarity purposes.

The access unit 310 accesses the data DAT of a layer to be applied in a first dataset, in which first dataset for each layer to be applied during the manufacturing it is indicated, whether in such layer there shall be a selective solidification of building material and, if that is the case, at which positions in such layer building material shall be solidified. The division unit 320 divides the area of the layer to be applied into subareas 110 and the assignment unit 330 assigns weighting factors $w_{ij}$ to the subareas 110. Then, based thereon, the specification unit 340 specifies an amount of building material to be supplied to the recoater 14 for the application of the layer. Based on this information the provision unit 300 determines the amount of building material based on the weighting factors $w_{ij}$ assigned to the individual subareas 110 and provides the same as building material consumption information AMI. The individual steps of this procedure have already been comprehensively described based on the above embodiments with the help of FIGS. 1 to 10.

Though in the figures the designated recoating area has always been divided into rectangular and quadratic, respectively, subareas 110 of the same size, of course, also a different geometry may be chosen for the individual subareas. In principle, all mathematically possible covers without gaps are possible here. In mathematics, for such a covering without gaps usually the term "tessellation" is used. Thus, in particular one can use triangles, quadrangles, pentagons, hexagons or combinations of the same when dividing the recoating area B into subareas 110. It is even not necessary to choose the areas of all subareas such that only a limited number of shapes exists and all subareas have the same size, respectively.

In principle, it is sufficient to divide the recoating area B into subareas 110 such that a covering without gaps exists, wherein the subareas need not necessarily be polygons.

A division of the recoating area B into rows and columns is advantageous for the determination of the powder need. In the most simple case there is a division into only two subareas (two columns or two rows). However, the further the recoating area B is partitioned (for example into at least three rows and at least three columns) the more accurate the powder need for a layer can be determined. In particular, the subareas 110 can be chosen to be stripes extending in the recoating direction across the whole extent of the recoating area B. In such a case, for a rather coarse determination of the powder need one can simply identify the stripe, for which the powder need will be a maximum and subsequently apply such maximum powder need to all stripes in the determination of the powder need. In this case, the same weighting factor would be assigned to all stripes. The method may further be refined by dividing the recoating area B into rows and columns, by determining then the powder need in each row in parallel to the recoating direction and by assigning then to the respective subareas in all rows the same weighting factors as in the row for which a maximum powder need had been identified.

Furthermore, the invention is applicable in particular in cases in which by a partitioning transverse to the recoating direction the recoater is able to store transverse to the recoating direction different amounts of powder for a layer application. Furthermore, the invention is readily applicable in cases in which several different building materials are used during the manufacturing by means of a layerwise additive manufacturing device. In such cases, a division of the recoating area and an assignment of weighting factors is simply carried out for each building material type separately.

As described above, the method according to the invention may be carried out in all modifications in a powder consumption information provision unit, which primarily is a data processing device. Such a data processing device may be an embedded system in a layerwise additive manufacturing device, a control computer for a layerwise additive manufacturing device or any other computer system (such as a computer on which objects to be manufactured by means of a layerwise additive manufacturing device are designed). Advantageously, the inventive method of providing a building material consumption information is implemented as computer program. Information needed by the method either may be derived from data of an object to be manufactured by means of a layerwise additive manufacturing method or else may be input by a user via a user interface. In case the method according to the invention is carried out by a designer of objects to be manufactured, it is possible to determine already during the design how many objects may be manufactured in parallel in a building process for an optimal use of the building material. Of course, the method according to the invention will be most advantageous for the user of a layerwise additive manufacturing device. With the method according to the invention, which provides a building material consumption information for a manufacturing process of objects and thereby provides a cost information for the manufacturing process, the whole manufacturing process can be optimized with regard to the manufacturing costs by a skillful choice of the position and orientation of the objects to be manufactured in the building space of a layerwise additive manufacturing device. Advantageously, the method of providing a building material consumption information is embedded in a method of providing a control command set for a layerwise additive manufacturing device, because in such a case a control command set for a layerwise additive manufacturing device for the manufacturing of objects in this device is provided, which is optimized with regard to the manufacturing costs, meaning the powder consumption.

Though the present invention was described based on a laser sintering and laser melting device, respectively, it is not limited to laser sintering or laser melting. It can be applied to any methods of manufacturing a three-dimensional object by a layerwise application and selective solidification of a building material in powder form. For example, the laser may comprise a gas or solid state laser, a laser diode or any other type of laser. In general, any device by which radiative energy may be selectively applied on a layer of the building material may be used. For example, instead of one laser a plurality of lasers, a different light source, an electron beam or any other energy and radiation source, respectively, can be used that is able to solidify the building material. The invention may also be applied in selective mask sintering, in which an extended light source and a mask are used, or may be applied in absorption sintering and inhibition sintering, respectively. Finally, an application of the invention is possible even in cases in which the layerwise additive manufacturing device is a 3D printing device, in which in order to solidify the building material a glue is sprayed on the same. In general, the invention is related to the manufacturing of an object by means of a layerwise application and selective solidification of a building material in powder form independent of the way in which the building material is solidified.

Different types of powder may be used as building material, in particular metal powders, plastic powders, ceramic powders, sand, filled or mixed powders.

What is claimed is:

1. A method of manufacturing a three-dimensional object by a layer-wise additive manufacturing apparatus by applying a layer of a building material in powder form layer-wise on a support or an already existing layer of the building material over a build surface using a recoater to spread powder over the build surface, and by solidifying the building material in parts by a supply of heat to those positions of the layer that correspond to a cross-section of the three-dimensional object by selectively scanning the layer with energy radiation, and repeating the application of the layer and solidification to build the three-dimensional object, the method comprising:
   accessing, from a first dataset, data of the layer to be applied over a build surface area, the first dataset indicates a location associated with a selective solidification of building material in the layer;
   dividing the build surface area of the layer to be applied into a plurality of virtual subareas;
   assigning a weighting factor to each subarea of the plurality of virtual subareas, each weighting factor indicating an extent of the powder needed for a respective subarea of the plurality of virtual subareas, and the weighting factors being assigned in a manner that increases with an increase in the amount of an object cross section that is to be solidified in a subarea;
   specifying an amount of powder to be supplied to the build surface area for the application of the layer based on a sum of the weighting factors assigned to each subarea of the plurality of virtual subareas, the amount of powder being less than a predetermined standard layer amount;
   supplying the amount of powder to the build surface based on the specifying of the amount; and
   solidifying the powder in an applied layer,
   wherein the weighting factors are further increased based on a distance of a subarea encompassing a portion of a cross section from a starting point of the recoater.

2. The method according to claim 1, wherein the subareas cover the area of the layer to be applied by forming an array of rows and columns.

3. The method according to claim 1, wherein:
   positions and shapes of regions to be solidified in at least one previous layer are determined, and
   when a solidified region exists in the at least one previous layer, the plurality of virtual subareas of the layer to be applied that are located at least partially above a solidified region are assigned a higher weighting factor as compared to the plurality of virtual subareas that are not located at least partially above the solidified region.

4. The method according to claim 3, further comprising:
   dividing the area of the layer to be applied into rows arranged in parallel to a direction of movement of the recoater and columns arranged orthogonally to the direction of movement of the recoater;
   calculating, for each row, a sum of the weighting factors of all subareas;
   identifying the row having a highest sum of the weighting factors; and
   assigning all subareas in one of the columns a value of the weighting factor of such subarea in the column that lies in the row having the highest sum.

5. The method according to claim 3, wherein:
   the positions and shapes of solidified regions in the at least one previous layer are simulated with respect to a state after a solidification thereof by energy radiation, and
   assigning the weighting factors to subareas comprises considering whether a subarea lies at least partially above a solidified region provided by the simulation.

6. The method according to claim 5, wherein the simulation of positions and shapes of solidified regions in the at least one previous layer includes an image of the solidified region in a state after solidification.

7. The method according to claim 1, wherein the plurality of virtual subareas are stripes arranged in parallel to a direction of movement of the recoater across the layer to be applied.

8. The method according to claim 1, wherein assigning the weighting factors to the plurality of virtual subareas comprises considering type of building material that is used.

9. The method of claim 1, further comprising:
   providing a control command set for the manufacturing of the three-dimensional object;
   providing building material consumption information; and
   generating the control command set for the layer-wise additive manufacturing apparatus, wherein the amount of powder to be supplied to the recoater for the application of the layer is specified in the control command set.

10. The method of claim 9, wherein:
    the layer-wise additive manufacturing apparatus is controlled by the control command set,
    the layer of the building material in powder form is provided on a support or an existing layer of the building material in powder form,
    the applied layer is solidified by electromagnetic radiation or particle radiation,
    the radiation acts on all positions of the layer to be solidified to melt the powder grains at these positions partially or completely by heat energy introduced by the radiation, and
    the powder grains are connected to each other as a solid state body after cooling.

11. The method according to claim 1, wherein an area where powder is to be solidified is divided into subareas.

12. A method of manufacturing a three-dimensional object by a layer-wise additive manufacturing apparatus by applying a layer of a building material in powder form layer-wise on a support or an already existing layer of the building material over a build surface using a recoater to spread powder over the build surface, and by solidifying the building material in parts by a supply of heat to those positions of the layer that correspond to a cross-section of the three-dimensional object by selectively scanning the layer with energy radiation, and repeating the application of the layer and solidification to build the object, the method comprising:

accessing, from a first dataset, data associated with the layer to be applied, the first dataset indicates a location associated with a selective solidification of building material in the layer;

dividing an area of the layer into a plurality of subareas covering the area of the layer;

assigning a weighting factor to each subarea of the plurality of subareas, each weighting factor indicating an extent of the powder needed for a respective subarea;

specifying an amount of powder to be supplied to the build surface for the application of the layer based on a sum of the weighting factors assigned to each subarea of the plurality of subareas, the amount of powder being less than a predetermined standard layer amount;

supplying powder to the build surface in accordance with the specified amount; and solidifying the supplied powder, the weighting factors assigned to each subarea monotonically increasing in a direction of movement of the recoater.

* * * * *